United States Patent [19]

Miguel et al.

[11] 4,299,872
[45] Nov. 10, 1981

[54] INTUMESCENT MATERIAL-HONEYCOMB THERMAL BARRIER

[75] Inventors: Anthony S. Miguel, Leucadia; John L. Perry, El Toro; Gary R. Wittman, Costa Mesa, all of Calif.

[73] Assignee: The United States of America as represented by the Secretary of the Navy, Washington, D.C.

[21] Appl. No.: 77,689

[22] Filed: Sep. 21, 1979

Related U.S. Application Data

[63] Continuation-in-part of Ser. No. 833,851, Sep. 16, 1977, abandoned.

[51] Int. Cl.³ .............................................. B32B 3/12
[52] U.S. Cl. .......................... 428/117; 260/DIG. 24; 428/921; 521/907
[58] Field of Search ................. 428/73, 116, 117, 920, 428/921; 521/907; 156/77–79, 197; 260/DIG. 24

[56] References Cited

U.S. PATENT DOCUMENTS

| | | | |
|---|---|---|---|
| 2,684,953 | 7/1954 | Stilbert, Jr. et al. | 428/921 X |
| 2,744,042 | 5/1956 | Pace | 428/117 X |
| 2,753,642 | 7/1956 | Sullivan | 428/71 X |
| 3,000,020 | 9/1961 | Lombard et al. | 244/122 R X |
| 3,053,714 | 9/1962 | Edwards | 428/921 X |
| 3,210,233 | 10/1965 | Kummer et al. | 428/117 |
| 3,235,441 | 2/1966 | George, Jr. et al. | 428/117 |
| 3,249,659 | 5/1966 | Voelker | 428/117 X |
| 3,320,087 | 5/1967 | Erickson | 521/907 X |
| 3,321,154 | 5/1967 | Downs | 244/1 |
| 3,364,097 | 1/1968 | Dunnington | 428/117 |
| 3,466,222 | 9/1969 | Curtis | 428/337 X |
| 3,475,262 | 10/1969 | Sargent et al. | 428/117 |
| 3,567,162 | 3/1971 | Lea | 244/121 |
| 3,644,158 | 2/1972 | Strumbos | 428/117 X |
| 3,663,267 | 5/1972 | Moran | 428/452 |
| 3,730,891 | 5/1973 | Riccitiello et al. | 252/8.1 |
| 3,840,425 | 10/1974 | Finelli et al. | 428/117 X |
| 3,916,057 | 10/1975 | Hatch et al. | 428/236 |
| 3,934,066 | 1/1976 | Murch | 428/248 |
| 4,018,962 | 4/1977 | Pedlow | 428/245 |
| 4,052,526 | 10/1977 | Pratt et al. | 428/920 X |
| 4,054,477 | 10/1977 | Curran | 156/197 |
| 4,061,812 | 12/1977 | Gilwee, Jr. et al. | 428/117 |
| 4,088,723 | 5/1978 | Norton | 428/117 X |
| 4,135,019 | 1/1979 | Kourtides et al. | 428/117 |
| 4,251,579 | 2/1981 | Lee et al. | 428/73 |

*Primary Examiner*—Henry F. Epstein
*Attorney, Agent, or Firm*—R. S. Sciascia; W. Thom Skeer; Kenneth G. Pritchard

[57] ABSTRACT

A thermal barrier comprising a heat responsive intumescent insulating material partially filling open cells in a layer of fire retardant honeycomb material. The thermal barrier is adhesively bonded to the inner surface of an aircraft skin panel. The intumescent material is in thermal contact with the skin and expands in response to heat conducted through the skin. The intumescent material may comprise one or more of a wide variety of matrix systems and fillers. Interior upholstery adhesively bonded to the honeycomb material completes the thermal barrier installation.

3 Claims, 3 Drawing Figures

INTUMESCENT MATERIAL-HONEYCOMB THERMAL BARRIER

Related to U.S. application data, continuation-in-part of Ser. No. 833,851, Sept. 16, 1977, and now abandoned.

BACKGROUND OF THE INVENTION

1. Field of the Invention

This invention pertains to thermal barriers, and more particularly to intumescent thermal barriers and in even greater particularity to foaming intumescent thermal barriers.

2. Description of the Prior Art

Thermal barriers in the form of intumescent paints or tape have been used for protecting coated or taped objects from exposure to high temperatures. Hackh's Chemical Dictionary defines intumescence as the swelling up of a material upon heating. When subjected to heat, intumescent paints begin to expand and form a light carbonatious char of significant thickness. This char layer adhers to the coated objects and expands to many times the thickness of the original coating. Some intumescents expand to 10 or 20 times their original volume. Such intumescents are referred to as foaming intumescents. The char layer is a thermal insulator and thus effectively protects the substrate from heat, and further serves as an oxygen barrier.

U.S. Pat. No. 3,934,066 to Robert Murch describes a variety of intumescent laminate systems for application to combustible or heat sensitive substrates. Generally, intumescent paints, or laminates such as intumescent tapes, expand in the presence of heat to form a thick fire resistant layer having little, if any, structural strength. In an actual fire, the intumescent coating forms a light, heat resisting layer which is easily damaged, for example, by water from a fire hose or from an automatic sprinkler.

In a practical fire fighting strategy the first objective is to knock down the flames, not to bring the burning material instantaneously to room temperature. Hence, the same stream of water which knocks the flames down also removes the intumescent coating from the protected object, and since high temperature still exists in the immediate vicinity, the object will nearly always be reset on fire. Also, the structure to which the intumescent coating is adhesively attached will significantly deform or buckle due to thermal expansion and fire induced thermal stress. The difference in coefficients of thermal expansion between the substrate structure and the intumescent coating combined with its low structural strength results in the coating cracking and separating from the substrate. The coating is then removed from the substrate by gravity, wind, water from a hose, or fire induced connection shears. For these reasons, intumescent coatings standing by themselves have not been practical for use where the protective coating may be damaged prior to use. Mechanical wear, scratches and abrasions can also destroy the effectiveness of a coating because, if the fire can penetrate at a scratch to the substrate, the thermal barrier is bypassed and rendered ineffective. Also, all practical organic coatings are sources of unacceptable smoke production and toxic gases.

Aircraft which are potentially susceptible to exposure in an aircraft carrier deck fuel fire require thermal barriers beneath the cockpit area to prevent flame and toxic gas infiltration of the cockpit. Thermal barriers applied to the exterior of such aircraft are impractical because of the maintenance problems they create, the adverse flight environment such barriers would be exposed to, and their detrimental effects upon aircraft performance.

SUMMARY OF THE INVENTION

The problems inherent in prior art organic or inorganic intumescent coatings when applied to objects where such coatings could be easily be abraded have been solved by the present invention wherein a structural layer of fire retardant honeycomb material is adhesively bonded, for example, to the inner surface of an aircraft exterior skin panel. Intumescent material partially fills each open cell in the honeycomb material. This, intumescent coating contains foaming agents which are decomposed by heat. When subjected to high temperatures, the foaming agents increase in volume and produce a highly effective insulating carbon foam.

When the exterior surface of the aircraft skin panel is exposed to flame, heat is conducted through the skin panel to the intumescent material. The intumescent material responds to the conducted heat by expanding within each honeycomb cell to substantially fill that cell. The cells are arranged to have the increase in volume result in an increased depth of foam the fire must penetrate to reach the cockpit. The thermal barrier thus formed has nearly the heat transfer properties of an intumescent layer standing by itself, while adding the structural strength of fire retardant honeycomb material. Thus, any mechanical abrasions, as by water from a hose or other source, will not remove the expanded intumescent layer from the skin panel, and better protection of the aircraft cockpit contents will result. This thermal barrier, of course, could be used in any application other than an aircraft, as for example in an automobile, ship building, or the like.

BRIEF DESCRIPTION OF THE DRAWING

A complete understanding of the present invention and the objects thereof may be gained from a consideration of the following detailed description of the preferred embodiment, presented hereinbelow in connection with the accompanying drawing figures in which.

DESCRIPTION OF THE PREFERRED EMBODIMENT

Figure 1:
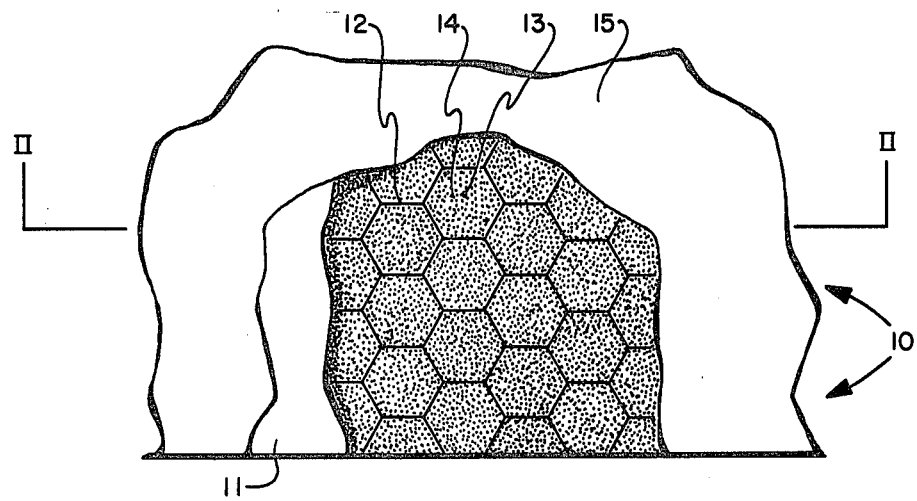
FIG. 1 illustrates a cut-away view of a thermal barrier.
Figure 2:
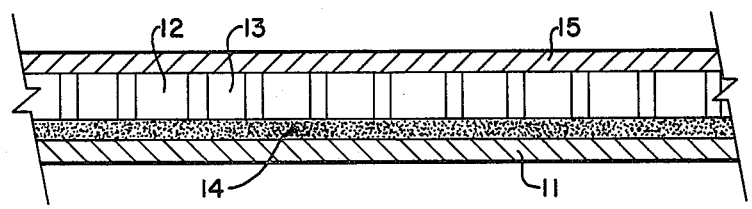
FIG. 2 illustrates a sectional view taken along line II—II in FIG. 1 of a thermal barrier bonded to a panel.

Referring now to the drawings wherein like reference numerals correspond to like parts and elements throughout the several views there is shown in FIG. 1 thermal barrier 10 which comprises flame retardant honeycomb material 12 and intumescent material 14. Honeycomb material 12 is adhesively bonded to metallic panel 11 which could represent the exterior skin of an aircraft or other vehicle or structure, but which would not necessarily be required to be metallic. Fire resistant decorative layer 15 is optional, and could be adhesively bonded to honeycomb material 12 to provide a decorative or functional interior finish, while providing some additional protection for honeycomb material 12. Expansion volume 13, initially vacant, becomes substantially filled by expanded intumescent material 14 when the exterior of metallic panel 11 is exposed to high temperature. Expansion volume 13 must be significantly greater than the volume occupied by intumescent material 14. In the preferred embodiment, intumescent material 14 will foam to a volume of 10 to 20 times its preheated volume.

Intumescent material suitable for use in the present invention, if it is to be used for protection of personnel or animals, should contain no organic ingredients which could produce toxic fumes or gases upon expansion. For other applications, this restriction would not be necessary. The various materials useful as intumescents described in U.S. Pat. No. 3,934,066 to Murch could all be used advantageously in the present invention, subject only to the thermal efficiency required and degree of toxic fumes to be tolerated by a specific application. A technical report entitled "Report Number U-6213 Thermal Protective Coatings" which is unclassified and available to the public from the National Technical Information Service, Springfield, VA 22161 under accession number AD:A031035 gives further details regarding acceptable materials and thermal performance of those materials for use in the present invention, and is incorporated herein by reference. Intumescent material 14, once heated, has undergone a permanent change. Intumescent material 14 decomposes upon being heated to the expanded foam described above.

Figure 3:
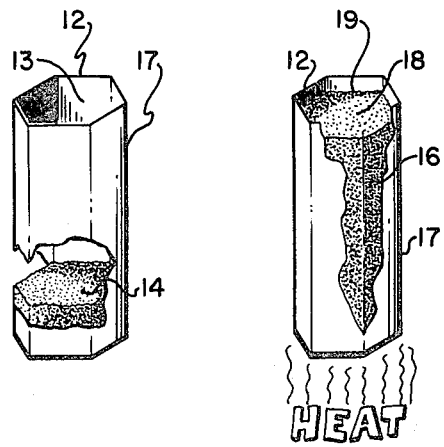
FIG. 3 illustrates the intumescent mechanism of the present invention with respect to a single cell within a layer of honeycomb material.

Fig. 3 illustrates the intumescent mechanism of the present invention. Initially, intumescent material 14 occupies a small portion of honeycomb cell 17, which is shown cut away to facilitate understanding but which normally has continuous sides. Upon application of heat, intumescent material 14 expands to expanded intumescent 16 which has a very low rate of heat transfer, and which substantially fills expansion volume 13 in each honeycomb cell affected by heat. Although the present invention could be separated from the substrate by severe heat induced buckling and warpage of the substrate, the barrier integrity is maintained by the structural honeycomb which prevents cracking, peeling, or scratching of the intumescent layer. By filling the base of cell 17, intumescent material 14 can only expand in a direction that opposes the flow of heat.

Intumescent material 14 and expanded intumescent 16, which of course are the same material, are made up of a matrix system 19 and may include a filler 18, although filler 18 is not required to practice the invention. Matrix system 19 could for example, be any of the intumescent compositions disclosed in the Murch patent mentioned above or could be an epoxy resin, vinyl resin, silicone resin, sodium silicate, latex, phenolic resin, silicone rubber, butyl rubber, magnesium oxide, or magnesium chloride, either alone or usually in combination with one or more other ingredients. The filler, which for a personnel protection application such as an aircraft cockpit where production of toxic gases is undesirable, could be material such as graphite fiber, asbestos, hydrous mica or vermiculite, glass, perlite, borax, potassium nitrate, nylon, sand, or aluminum hydroxide for example. Of course, many other materials such as ceramic materials could be used, and the requirements of a specific application for a given thermal barrier must be considered. Glass in the form of glass microspheres encapsulating air or other gases is one filler possibility. For specific details of performance of various materials, one should consult "Report No. U-6213 Thermal Protective Coatings", mentioned above.

A fire barrier for installation in a jet fighter was actually constructed for protection of the pilot compartment. The fire retardant intumescent material 14 was mixed together in the following proportion: 33.9% number 3 vermiculite (hydrous mica), 65.8% ALBI-107A, which is an intumescent solvent based modified vinyl coating manufactured by the Sherwin Williams Company, and 0.3% high tensile strength graphite fiber 1½" (1.27 centimeter) long, all percentages being by weight. Six sheets, 24.25 by 19 inches (61.060 by 48.26 centimeters), were made, and 1½" (1.27 centimeter) thick, 3/16 inch (0.48 centimeter) cell size, 5.5 pounds per cubic foot (88.1 kilogram per cubic meter) glass/phenolic honeycomb was set into the fire retardant material. The honeycomb material could be any cell size, and should be fire retardant honeycomb as is commonly used in aircraft construction.

The sheets were prepared by placing a sheet of nylon film over an aluminum plate, then a layer of silicone impregnated fiber glass cloth, used for release, was placed over the nylon. The silicone impregnated fiber glass cloth was coated with a thin layer of ALBI-107A and allowed to dry to resist further absorption when the fire retardant intumescent was applied. A total of 1,044 grams of the fire retardant intumescent material was mixed and poured onto the release cloth and spread to an area approximately 24 by 18 inches 61 by 48 centimeters) which resulted in a thickness of about 0.080 inch (0.20 centimeter). The phenolic honeycomb was then placed on the fire retardant mixture. To push the honeycomb into the fire retardant mixture, a press having a force of 20,000 pounds (88,964 newtons), which is approximately 45 psi (310,264 pascal), was used. When the ALBI-107A had cured, the release cloth was peeled off and the excess intumescent material trimmed. Six sheets, 24 by 19 inches (61 by 48 centimeter), of fire retardant material were also made without the phenolic honeycomb using the same procedure described above.

The prefabricated thermal barrier comprising a layer of fire retardant honeycomb and intumescent material was then installed in an A-4 jet cockpit compartment. Several of the cockpit compartment components had to be removed, such as the seat, side plates, foot pedals, and other equipment. Insulation pads and adhesive plus paint and primer were removed from the inner surface of aircraft skin within the cockpit compartment by means of rotary wire brushes and a drill motor. In some inaccessible areas, methyl-ethylketone and a scraper were used.

Cardboard templets were cut out and fitted into place before the fire retardant thermal barrier was cut into sections. The sections were bonded using an apoxy adhesive and catalyst. A total area of approximately 1400 square inches (9,032 square centimeters) was covered, resulting in a weight gain of 3,361 grams fire retardant intumescent material and honeycomb, 135 grams intumescent fire retardant material without honeycomb, 950 grams of adhesive, and 700 grams wet fire retardant for patching, a total of approximately 5,146 grams. Some sections had to be cut into two or three sections to be fitted into place against curved surfaces since the honeycomb and intumescent material thermal barrier does not bend very well when cured. Bending the barrier before it is cured should eliminate this problem. A wet fire retardant mixture was used as putty to fill in inaccessible cracks between sections. Finally, all aircraft equipment such as the seat, side plates, upholstery, and other components previously removed were reinstalled.

Exposure of an aircraft equipped in this manner to a deck fuel fire results in heat transferring by conduction through exterior skin to thermally contact intumescent material 14 within each honeycomb cell. Since the honeycomb cells are arranged transversly to the honeycomb layer, maximum amounts of intumescent materials are exposed to the inner surface of the skin panel. The intumescent material then decomposes or foams to expanded intumescent 16, substantially filling each honeycomb cell. The insulating thermal barrier thus produced greatly lengthens the time a pilot may safely remain in the cockpit before the flame is able to penetrate the pilot compartment. This increased time better enables fire fighters to knock down the flames or tow the aircraft to a location where the pilot can safely escape.

Obviously many materials may be substituted for those disclosed and an equivalent barrier constructed. Accordingly, the invention is to be construed in its broadest terms as an intumescent material in combination with honeycomb structure.

What is claimed is

1. A thermal barrier comprising:

a layer of fire-retardant honeycomb material having a plurality of open cells;

an exterior panel connected to said honeycomb material for closing the side of said honeycomb material expected to undergo a temperature increase; and an intumescent insulating material partially filling said cells, said intumescent insulator bonded to said cells and against said exterior panel for decomposing into an expanded foam when heated, such that a fire-resistant layer filling said cells is formed and where said intumescent insulating material is selected from the group consisting of epoxy resin, vinyl resin, silicone resin, sodium silicate, silicone rubber, butyl rubber, magnesium oxide and magnesium chloride.

2. A thermal barrier as described in claim 1 wherein said intumescent insulating material that decomposes into an expanded foam further comprises a filler selected from the group consisting of graphite fiber, asbestos, hydrous mica, glass, perlite, borax, potasium nitrate, nylon, sand and aluminum hydroxide.

3. A thermal barrier as described in claim 1 or claim 2 further comprising an interior layer connected to said honeycomb for closing the side of said honeycomb material not expected to undergo a temperature increase.

* * * * *

UNITED STATES PATENT AND TRADEMARK OFFICE
CERTIFICATE OF CORRECTION

PATENT NO. : 4,299,872

DATED : 10 November 1981

INVENTOR(S) : Anthony San Miguel, John L. Perry, and Gary R. Wittman

It is certified that error appears in the above–identified patent and that said Letters Patent are hereby corrected as shown below:

Front page, number [19] should be corrected by deleting "Miguel et al." and replacing it with "San Miguel et al."

Front page, number [75] should be corrected by deleting "Anthony S. Miguel" and replacing it with "Anthony San Miguel."

Signed and Sealed this

Twentieth Day of April 1982

[SEAL]

Attest:

GERALD J. MOSSINGHOFF

Attesting Officer

Commissioner of Patents and Trademarks